Patented Apr. 1, 1924.

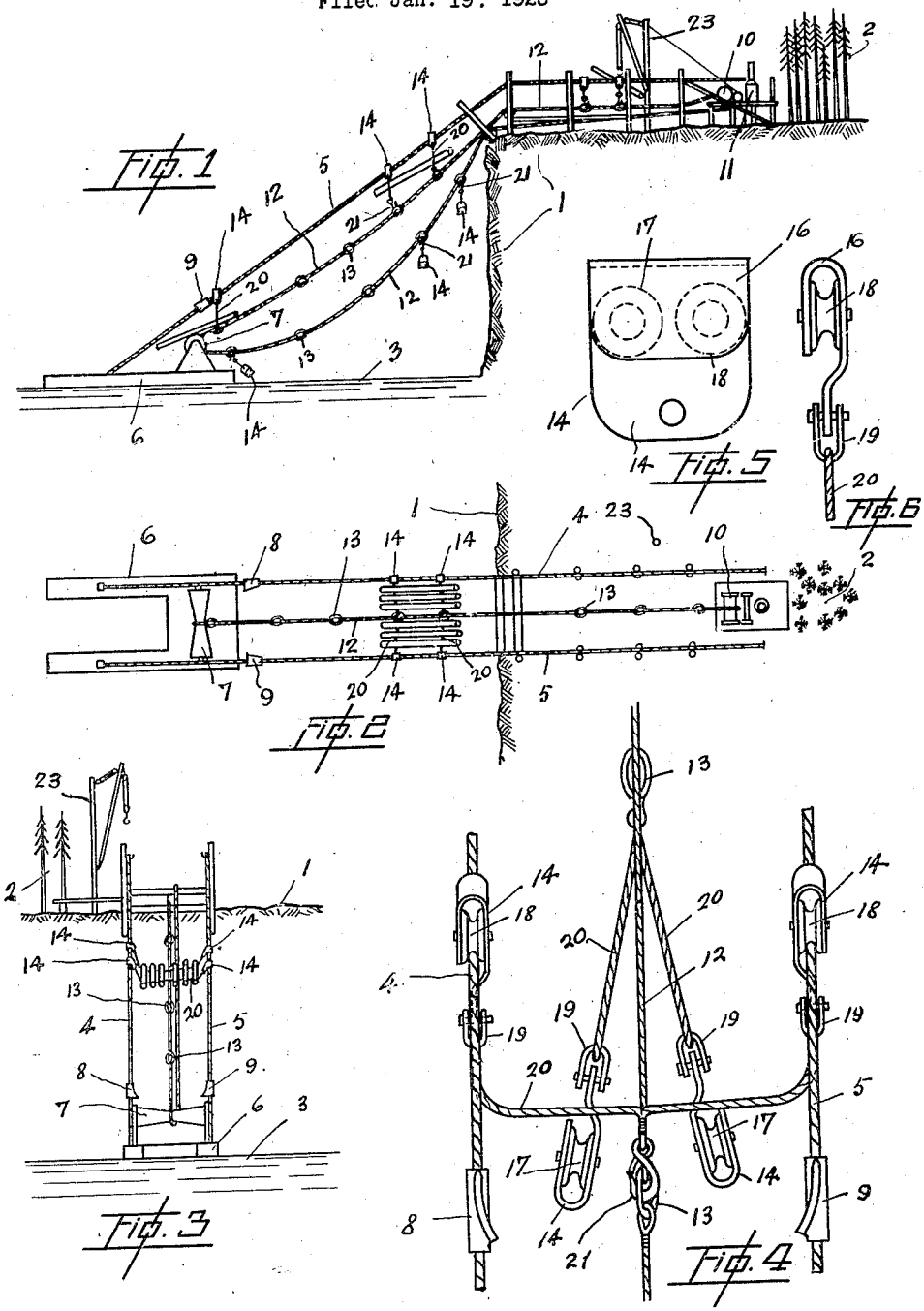

1,489,083

UNITED STATES PATENT OFFICE.

DANIEL P. McDONALD, OF VANCOUVER, BRITISH COLUMBIA, CANADA.

LOGGING-TRANSMISSION SYSTEM.

Application filed January 19, 1923. Serial No. 613,730.

*To all whom it may concern:*

Be it known that I, DANIEL P. McDONALD, a subject of the King of Great Britain, residing at the city of Vancouver, in the Province of British Columbia, Canada, have invented certain new and useful Improvements in Logging-Transmission Systems, of which the following is a specification.

My invention relates to improvements in logging transmission systems, and the object of my invention is to provide a system by the use of which logging operations may be carried on for the removal and transportation of logs from high places in a highly practical and economical manner, thereby rendering available for the market large areas of timber which cannot be economically logged at the present time on account of either the impracticability or expense of installing any system at present known and operating it efficiently and at a profit.

I attain this object by the construction illustrated in the accompanying drawings in which—

Fig. 1 is a side elevation illustrating my invention in its application to high bench land on a waterfront.

Fig. 2 is a plan view of Fig. 1.

Fig. 3 is a face view.

Fig. 4 is a detail view of a sling and carrier block.

Figs. 5 and 6 are side and end views of a carrier block.

Similar reference numerals indicate similar parts throughout the several views.

In many places in different localities there are large areas or stands of timber which it is practically impossible to log at the present time on account of the height of the land on which the timber is situated above the booming ground. The methods usually attempted are either to skid the logs down a chute from the logging area to the water or to transmit them thereto down a sky line, but the great expense involved in building a chute of this size and keeping it in order, and the slow operation of a sky line system, render these methods practically useless for the object in view.

It is to enable logging operations of this character to be effected with economy and profit that I have devised the system now to be described, although it will be readily understood that the system is applicable with equal facility to logging operations of a much less difficult character.

1 indicates a bench of high land, which might be, say 500 or 600 feet above sea level on which the timber area to be logged is situated, the standing timber being indicated by the numeral 2. The booming ground, which may be the sea, a lake or any body of water suitable for receiving the logs, is indicated by the numeral 3.

Two main stationary cables 4 and 5 are extended from suitable points at a distance back from the edge of the cliff, running level from the fixed points to the edge as shown, this level portion being supported by suitable spars in any well known manner. From the cliff edge the cables are inclined downwardly and extended at a designed slope, their lower extremities being secured to a float 6 anchored so as to maintain the cables 4 and 5 taut, this float being cut away as shown to allow the logs to drop into the water. Rotatably mounted on the float below the cables and positioned transversely of them is a roller 7, and at a designed distance, hereinafter more fully referred to, from the roller derail devices of any approved make, indicated by the numerals 8 and 9, are secured to the cables 4 and 5. Around the roller 7 and the drum 10 of a donkey engine 11 located on the bench is passed an endless cable 12 having inserted in it at spaced intervals rings 13. A number of hangers or carrier blocks 14 are used in the system, there being four carrier blocks for each log load, as will appear later, and each of these blocks consists of a plate 15 doubled over on itself at its upper edge, as at 16, and is provided within the doubled over portion with a pair of rotatably mounted sheaves 17 and 18 adapted to roll on the cable, 4 or 5, as the case may be, while at its lower end the plate is provided with a shackle 19 disposed so that the shackle axis lies in the same plane as the sheave axis. Between the shackle of each pair of carrier blocks extends a cable 20, which cable forms in effect a sling, from which sling depends at midlength a hook 21, of a kind adapted to be engaged quickly in any one of the rings 13 and capable of being quickly locked thereto or unlocked therefrom, such as a snap hook, for instance. 23 indicates a derrick for loading the logs on to the slings at the loading ground, that is, adjacent the level portion of the cables 4 and 5.

The manner of operation may be briefly described as follows: It being first of all understood that the rings 13 are spaced apart so that when two pairs of carrier blocks 14 are mounted on the cables 4 and 5 with the hooks 21 of their respective slings 20 engaged in two of the rings 13 the distance apart of the slings will be such as will support a log longitudinally when placed on the slings. So, the logs being cut and ready for transmission two pairs of carrier blocks are placed on the level portions of the cables 4 and 5, one pair in advance of the other pair, and by means of the derrick the logs are loaded on to the slings between the blocks until a full load is made up, whereupon the hooks of the slings are hooked respectively into a pair of rings 13 on the endless cable, and it should be understood that the hooks may be engaged into the rings while the cable 12 is in motion. It will thus be seen that the log load is connected to the endless cable the operation of which then carries the load along the level portions of the cables 4 and 5 and over on to the inclined portions until the first pair of carrier blocks come in contact with the derail devices 8 and 9 and are derailed or demounted from the cables 4 and 5. The front carrier blocks therefore fall from place but they are still connected to the endless cable by their hook 21, the front ends of the logs dropping down on to the roller 7. The continued operation of the cable brings the next set of carrier blocks into contact with the derail devices so that this pair of blocks also fall off the cables but in the meantime the logs have been carried on the roller 7 past their midlength so that they overbalance and fall into the water, from which it will be seen that the logs are automatically dumped at the proper moment and place and the carrier blocks are automatically demounted from the fixed cable but are maintained in connection with the endless cable so that they are then carried back thereby up to the loading ground for further use. The operation is continuous for as soon as one load is sent over the cliff another one may be made up and forwarded so that load after load may be transported without delay and thus the entire logging operations may be carried on with great economy, both in the matter of time and of labour, and, as will be readily seen, in a comparative simple manner.

What I claim as my invention is:—

1. A logging transmission system comprising a pair of parallel stationary cables, two pairs of carrier blocks mounted on said cables in oppositely arranged pairs one pair in advance of the other, means for supporting a load of logs from said carrier blocks, means for moving said blocks along the cables, and means for dislodging first one pair of blocks and then the other pair from the cables.

2. A logging transmission system comprising a pair of parallel stationary cables, two pairs of carrier blocks mounted on said cables in oppositely arranged pairs one pair in advance of the other, the blocks of each pair being connected by a sling, and means for moving the blocks along the cables.

3. A logging transmission system comprising a pair of parallel stationary cables, two pairs of carrier blocks mounted on said cables in oppositely arranged pairs one pair in advance of the other, the blocks of each pair being connected by a sling provided at midlength with a hook, an endless travelling cable arranged between the stationary cables, and means for connecting the said slings to the travelling cable.

4. A logging transmission system comprising a pair of parallel stationary cables, two pairs of carrier blocks mounted on said cables in oppositely arranged pairs one pair in advance of the other, the blocks of each pair being connected together by a sling, an endless travelling cable arranged between the stationary cables, and means for detachably connecting said slings to the travelling cable.

5. A logging transmission system comprising a pair of parallel stationary cables, two pairs of carrier blocks mounted on said cables in oppositely arranged pairs one pair in advance of the other, the blocks of each pair being connected by a sling provided at midlength with a hook, and an endless travelling cable arranged between the stationary cables provided with rings inserted in it at spaced intervals adapted to receive the hooks of said slings.

6. A logging transmission system comprising a pair of parallel stationary cables, two pairs of carrier blocks mounted on said cables in oppositely arranged pairs one pair in advance of the other, the blocks of each pair being connected by a sling provided at midlength with a hook, an endless travelling cable arranged between the stationary cables provided with rings inserted in it at spaced intervals adapted to receive the hooks of said slings, and derail devices mounted on the stationary cables in the path of the said carrier blocks arranged to dislodge first one pair and then the other pair from the cables.

7. A logging transmission system for transferring logs from high bench land to a booming ground at a lower level comprising a pair of parallel stationary cables extending downwardly at an inclination from the high land to a suitably positioned anchored float, two pairs of carrier blocks mounted on said cables in oppositely arranged pairs one pair in advance of the other, the blocks of each pair being connected by a sling provided at midlength with a hook, a roller mounted adjacent said float extending transversely of said cables, a power operated drum mounted on the high land, an endless cable passed around said roller and said drum arranged between the stationary cables and provided with rings inserted in it at spaced intervals adapted to receive the hooks of the said slings, and derail devices mounted on the stationary cables in the path of said carrier blocks arranged to dislodge first the one pair and then the other pair from the cables at a predetermined point in the length of the same.

In testimony whereof I hereunto affix my signature, at Vancouver, B. C. this 9th day of January, 1923.

DANIEL P. McDONALD.